Sept. 27, 1927.

J. G. PLATT

PISTON RING

Filed March 21, 1924 3 Sheets-Sheet 1

Inventor:
John G. Platt

Sept. 27, 1927.

J. G. PLATT

PISTON RING

Filed March 21, 1924  3 Sheets-Sheet 2

Inventor:
John G. Platt,
by Emery, Booth, Janney & Varney,
Attys

Sept. 27, 1927.   J. G. PLATT   1,643,628
PISTON RING
Filed March 21, 1924   3 Sheets-Sheet 3

Inventor:
John G. Platt.
by Emery, Booth, Janney & Varney,
Attys.

Patented Sept. 27, 1927.

1,643,628

UNITED STATES PATENT OFFICE.

JOHN G. PLATT, OF BRIGHTON, MASSACHUSETTS, ASSIGNOR TO HUNT-SPILLER MANUFACTURING CORPORATION, OF BOSTON, MASSACHUSETTS, A CORPORATION OF MASSACHUSETTS.

PISTON RING.

Application filed March 21, 1924. Serial No. 700,826.

This invention relates to the art of making piston rings.

The invention and its aims and objects will be best understood from the following description taken in connection with the accompanying drawings of a piston ring embodying one illustrative form of my invention, and of one mode or manner of carrying out my invention.

Figs. 8 to 12 both inclusive illustrate partly diagrammatically various steps of a preferred method of practicing my invention.

Figure 1:
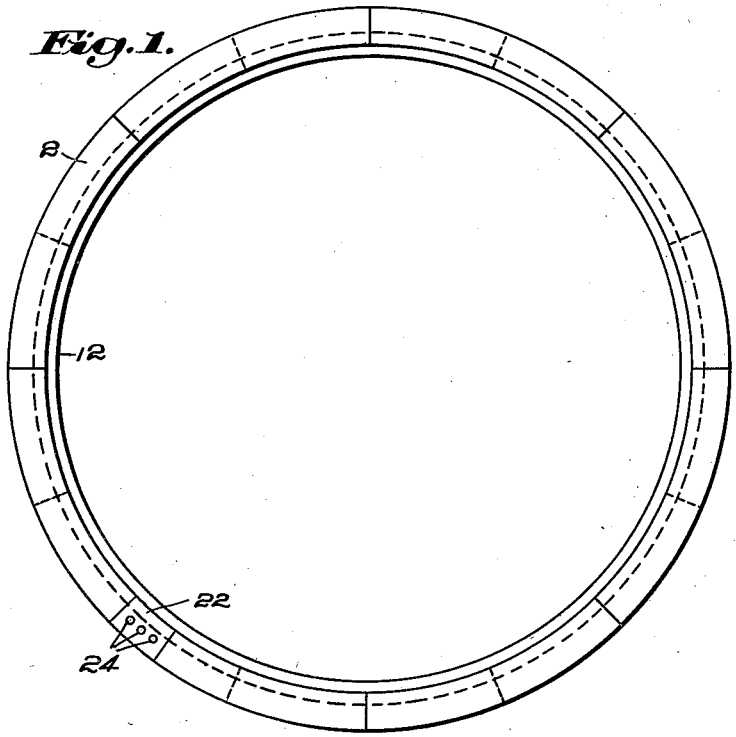
Fig. 1 is a top plan view of a piston ring embodying one illustrative form of my invention.
Figure 2:
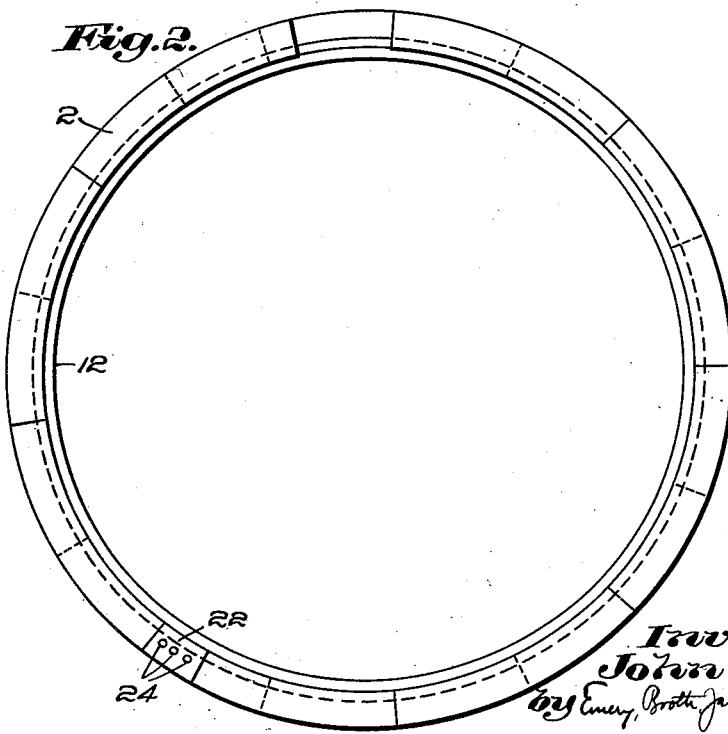
Fig. 2 is a top plan view of the piston ring shown in Fig. 1 after it has been worn, showing the segments bunched.
Figure 3:
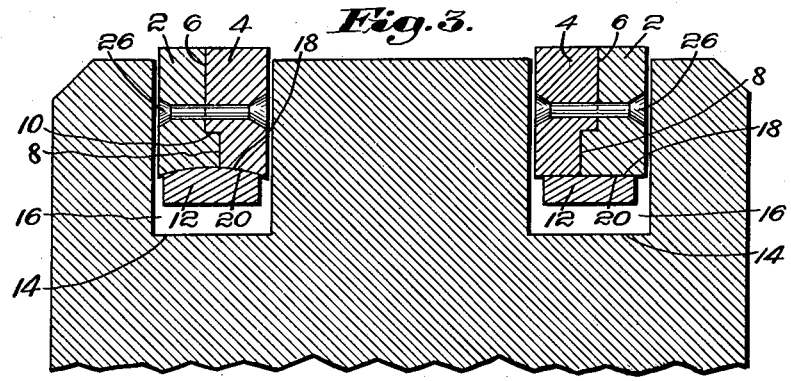
Fig. 3 is a longitudinal section of a piston showing in cross-section two piston rings embodying my invention assembled in slots of said piston.

Referring to Figs. 1 to 7 of the drawings, in the embodiment of my invention herein illustrated the ring comprises two sections, 2 and 4, one fitting upon the other. These two sections 2 and 4 are so shaped as to present parallel contacting surfaces at 6 and 8 connected by parallel contacting surfaces at 10 (see Fig. 3), so as to form an offset joint extending approximately centrally of the ring throughout the length thereof, the construction and arrangement being such that when the two sections 2 and 4 of the ring are assembled the two sections fit snugly together as illustrated in Fig. 3.

Where my invention is to be used in a construction in which, in the reciprocation of the piston, the ring section nearest the end of the piston is liable to arrive opposite the counter-bore or ports of the cylinder in which it operates, the section 2 of the ring will preferably be nearest the end or ends of the piston. By assembling the ring in this manner the section 4 remaining in contact with the inner surface of the cylinder in the reciprocation of the piston, will, due to the offset, prevent the section 2 from falling into the counter-bore or ports.

The ring is maintained in contact with the inner surface of the cylinder by an annular spring 12 interposed between the bottom surface 14 of the slot 16 and the inner edge surfaces 18 and 20 of the two sections 2 and 4 of the ring.

The inner edge surfaces 18 and 20 of the two sections may be flat as illustrated in the lower piston ring shown in Fig. 3, or they may be of concave curvature transversely of the ring as shown in the upper ring illustrated in said figure. In the latter case the outward surface of the spring 12 will preferably be convexly curved transversely of the spring in substantial correspondence to the concave curvature of the surfaces 18 and 20 of the ring sections. This construction has the advantage that the pressure exerted by the spring against the inner surfaces of the ring sections tends to spread said sections and maintain them in more intimate contact with the contacting surfaces of the slot 16 thus insuring at all times a tight fit. The spring also maintains a tight contact at the offset.

Figure 4:
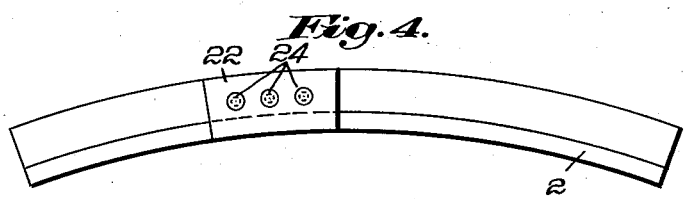
Fig. 4 shows in plan view one illustrative means for maintaining a constant overlap of the segments into which the ring is preferably divided and for preventing relative rotation of the two sections of the ring.
Figure 5:
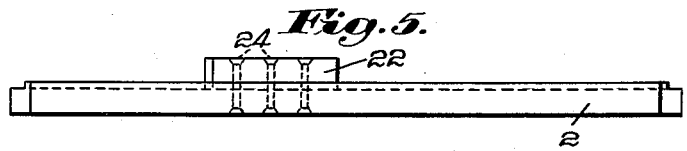
Fig. 5 is a side view of the arrangement shown in Fig. 4.

Each section 2 and 4 of the ring will preferably be divided into a number of segments. Any suitable number of segments may be used. In order to maintain a tight joint between the segments of the two ring sections, the segments of the two sections will preferably be placed in staggered relation in assembling the ring, the segments of one section of the ring thus overlapping the points of junction of the segments of the other section. In order to prevent relative rotation of the two sections of the ring whereby disarrangement of this staggered relation might occur in the operation of the piston, means are herein provided for preventing such relative rotation of the sections. One such means is illustrated in Figs. 4 and 5, wherein a small portion 22, removed from a segment of one section of the ring, can be secured in any suitable manner as by rivets 24 to a segment of the other section of the ring intermediate the two ends of said segment. When the segments of the two sections are assembled to form the ring this will bring the segments of the two sections into staggered relation and will prevent relative rotation of the two sections, as will be readily understood.

Figure 6:
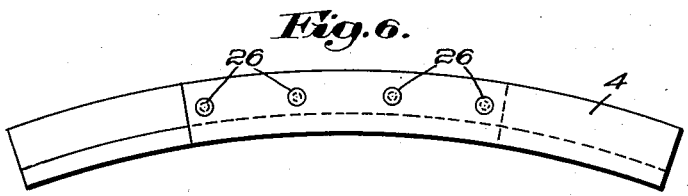
Fig. 6 shows in plan view another illustrative means for maintaining a constant overlap of the segments into which the ring is preferably divided and for preventing relative rotation of the two sections of the ring.
Figure 7:
Fig. 7 is a side view of the arrangement shown in Fig. 6.

In Figs. 6 and 7 is shown another arrangement for accomplishing the same object. In said figures a segment of one section of the ring is secured in any suitable manner as by rivets 26 to the cooperating segment of the other section so as to produce an overlap. As will be readily understood this arrangement produces an overlap of the sections throughout the ring and prevents relative rotation of the sections.

I shall now describe a preferred method for practicing my invention. The ring is preferably cut from a single tub, the two sections being cut from the tub in succession as will more fully appear from the following description. The cutting of the sections may be effected in any suitable manner and by any suitable means but I preferably use for this purpose parting tools of usual construction and operation, the cutting being effected by relative rotation of said tub and tools as it will readily be understood by those skilled in the art without a more detailed description.

Figure 8:
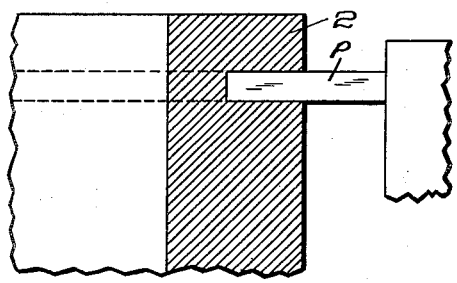
Figure 9:
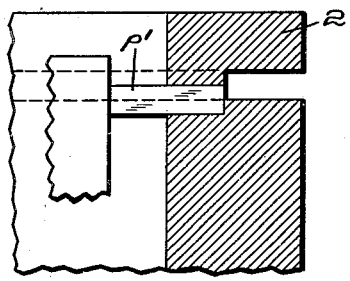

I preferably first cut into the outside of the tub with a parting tool P to the depth required to produce a ring section of the dimensions required, the ring section 2 for example, the tub used having a thickness of wall corresponding to the depth of the ring which it is desired to manufacture, as will readily be understood by those skilled in the art. After the cutting operation of this parting tool P has been effected from the outside of the tub, as illustrated in Fig. 8, a cut is made from the inside of the tub, with a parting tool P', at such a point with reference to the tool P as to produce the offset between the ring sections 2 and 4, as illustrated in Fig. 9. When the cuts meet the ring section 2 will be severed from the tub.

While I prefer to perform the two operations just described successively, it will be readily understood that they may be performed simultaneously if desired.

Figure 10:
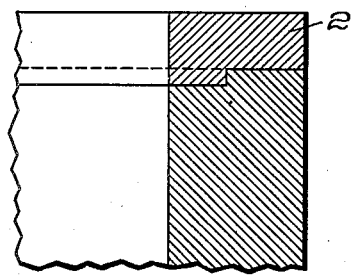

The ring section 2 if placed upon the top surface of the tub will now be found to fit exactly upon said top surface as illustrated in Fig. 10.

Figure 11:
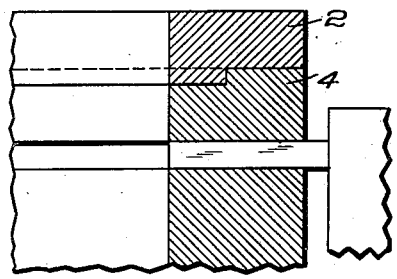
Figure 12:
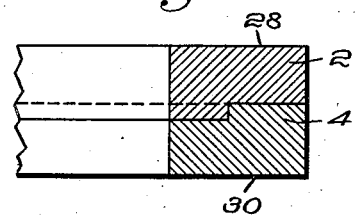

With the parting tool P I now cut into the outside of the tub, completely through the wall of the tub, as illustrated in Fig. 11, thus producing the second section of the ring, the section 4 for example. This cut will preferably be made at such a point that the section 4 produced will be of a thickness slightly greater than that desired for said section in the finished ring, the section 4 being completely severed from the tub by this operation; the outer surfaces 28 and 30 of the sections 2 and 4 will then be finished to give to the finished ring the thickness desired.

It will be seen that by repeating this cycle of operation any number of complete rings may be formed in succession from the tub.

After the two sections of the ring have been formed as described they are cut into the required number of segments and the means, as above described, for producing the overlapping relation of the segments of the two sections and preventing relative rotation of the two sections are applied.

It will be readily seen that a ring embodying my invention presents many advantages over those heretofore used. It is simple and economical of construction and extremely efficient in operation, the joints being all extremely tight and these and the ring itself being practically leak-proof. The method used in this construction is also very simple and economical, there being practically no waste of material in the production of the ring. Other advantages will readily suggest themselves to those skilled in the art.

It will be understood that while the invention is herein described as embodied in the details illustrated, the invention is not to be considered as circumscribed by or limited to these details or any of them, but that said details may be variously modified within the true scope of the invention which is definitely set forth by the claim. It will be understood also that it is now indispensable that all the features of the invention be used conjointly, since they may be used to advantage separately in various combinations and sub-combinations, as defined in the subjoined claim.

I claim—

A composite piston packing or ring comprising a double row of mating staggered segmental sections having shouldered interlocking engagement with each other, means for fastening at least two of said sections together to maintain the staggered relation of said sections, and spring means contacting with the inner faces only of said segmental sections, whereby the several parts of said ring may be individually assembled in a piston ring groove.

In testimony whereof, I have signed my name to this specification.

JOHN G. PLATT.